Sept. 29, 1964      S. KESH      3,150,641

DUST COVER FOR DOG

Filed Sept. 4, 1963

INVENTOR.
SEROUN KESH
BY Edward M. Apple
ATTORNEY

United States Patent Office 3,150,641
Patented Sept. 29, 1964

1

3,150,641
DUST COVER FOR DOG
Seroun Kesh, 18982 Ardmore, Detroit 35, Mich.
Filed Sept. 4, 1963, Ser. No. 306,437
1 Claim. (Cl. 119—160)

This invention relates to domestic pets and has particular reference to the care and well-being of dogs and cats.

It is well-known to animal lovers that dogs and cats harbor fleas and other pests and that the attempt to eradicate such pests oftentimes poses quite a problem. Efficient powders and sprays are now on the market for eliminating these pests, but their effective application and retention leaves much to be desired.

It is therefore an object of this invention to provide a device, which will greatly assist the animal owner, in the effective application and retention of such pesticides on the animal, for a period of time sufficient to do the work required.

Another object of the invention is to provide a covering of the character indicated, for an animal, which may easily be installed on, or removed from the animal.

Another object of the invention is to provide an animal covering of the character indicated, which will protect the clothing, rugs, furniture of the owner from damage, while the animal is being treated for fleas and the like.

Another object of the invention is to provide a device of the character indicated, which is constructed and arranged, so that it may be used to help rapidly dry the animal's fur after a bath, by the simple expedient of attaching thereto the hot air exhaust end of a hair dryer device, whereby to permit the hot air to reach all parts of the animal's body.

The foregoing and other objects and advantages of the invention will become more apparent as the description proceeds, reference being made from time to time to the accompanying drawing, forming part of the within disclosure, in which drawing.

Figure 2:
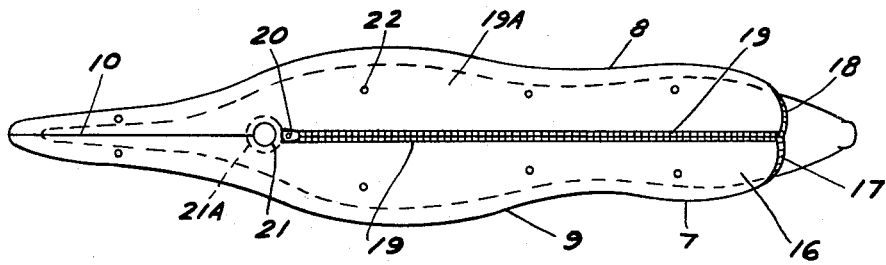
FIG. 2 is a top plan view of the device shown in FIG. 1.

Referring now more particularly to the drawing, it will be understood that in the embodiment herein disclosed, the reference character 7 indicates, in general, the device embodying the invention, which in this instance is applied to the dog after it is treated with a pesticide for fleas or other pests. The cover 7 is preferably made of tough, pliable, plastic material, such as "Pliofilm" or the like, which is pre-cut into 2 matching halves 8 and 9, which are heat-sealed, or otherwise secured together along their outer peripheries as at 10, to provide a substantially airtight cover for the animal. The cover 7 has a tail portion 11, leg portions 12, 13, 14, and 15, and a head portion 16, which terminates in a face opening 17, which is provided with an elastic edge 18. A slide fastening element, or "zipper" 19, closes the opening in the back portion 19A of the device, and extends from the elastic headband 18 to a point 20, so that the cover may be easily applied to the dog when the slide fastener is open.

Figure 1:
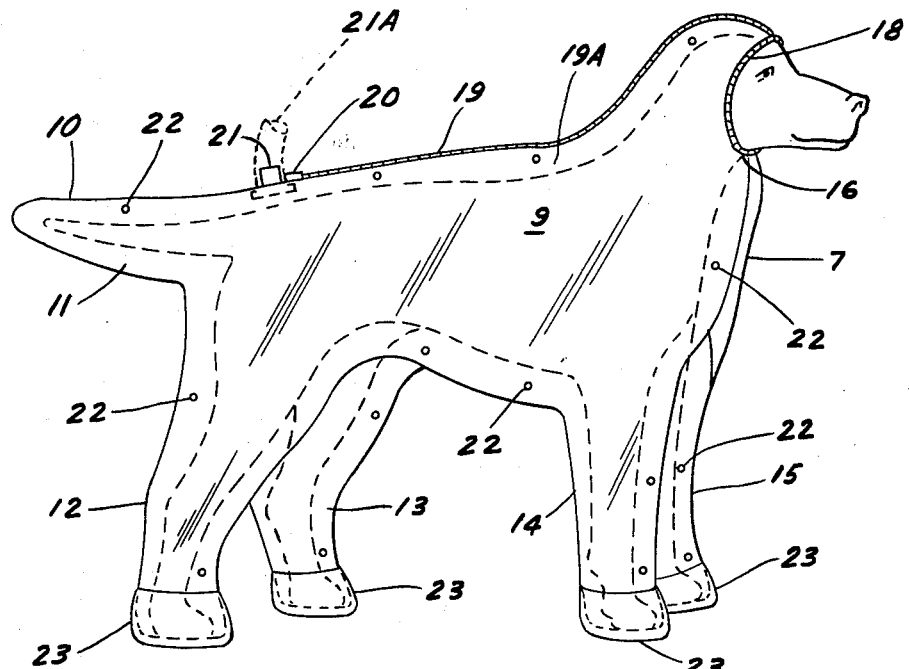
FIG. 1 is a perspective view of a dog which is garbed in a device embodying the invention.

I provide a flanged tubular insert 21 which may be inserted in the opening between the sections 8 and 9, and which may be held in place by drawing the slide fastener tightly against its side, as at 20 (FIG. 1). The purpose of the member 21 is to permit me to attach the hose 21A of a conventional hair dryer (not shown) to the cover, so that the same may be used to dry the dog after a bath, as well as using it for the retention of pesticides and the like. The cover 7 is preferably formed with a plurality of ventilating holes 22, so that warm air introduced to the interior of the cover may readily escape, and so that the dog does not become uncomfortably hot when garbed in the cover 7, during a depesting procedure.

In order to prevent the dog from pawing or scratching out of the cover 7, I provide padded boot-like elements 23 at the extremities of the leg portions as shown in FIG. 1.

It is believed that the operation of the device is obvious from the foregoing description.

Having described my invention, what I claim and desire to secure by Letters Patent is:

A pliable plastic cover of the character described, comprising a body portion, terminating at one end in a hood-like portion arranged to cover a substantial portion of the head of an aimal, said hood portion having an opening therein, bound with an elastic element, the opposite end of said body portion having an extension for receiving the tail of an animal, reinforced leg portions depending from said body portion, a longitudinal opening in said body portion, a slide fastener for closing said longitudinal opening, and a plurality of vent elements arranged in spaced relation in said body portion and said leg portions.

References Cited in the file of this patent
UNITED STATES PATENTS

| | | |
|---|---|---|
| 2,003,435 | Groff et al. | June 4, 1935 |
| 2,222,705 | Conlon | Nov. 26, 1940 |
| 2,443,831 | Miller | June 22, 1948 |
| 3,108,568 | Whitney et al. | Oct. 29, 1963 |